US010100900B2

(12) United States Patent
Gregory et al.

(10) Patent No.: US 10,100,900 B2
(45) Date of Patent: Oct. 16, 2018

(54) ENGINE BALANCE ASSEMBLY USING ELECTRIC MOTORS

(71) Applicant: Ford Global Technologies, LLC, Dearborn, MI (US)

(72) Inventors: Jonathan Gregory, Colchester (GB); Neill Scoging, Chelmsford (GB); Jon Edward Caine, Chelmsford (GB); Viktor Haeuser, Burscheid (DE); Ivan Mark Rogers, High Wycombe (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/429,072

(22) Filed: Feb. 9, 2017

(65) Prior Publication Data
US 2017/0241510 A1 Aug. 24, 2017

(30) Foreign Application Priority Data

Feb. 18, 2016 (GB) .................................. 1602826.8

(51) Int. Cl.
F16F 15/22 (2006.01)
F16F 15/28 (2006.01)
(Continued)

(52) U.S. Cl.
CPC ............ *F16F 15/223* (2013.01); *F02D 29/00* (2013.01); *F16F 15/002* (2013.01); *F16F 15/22* (2013.01);
(Continued)

(58) Field of Classification Search
CPC ...... F16F 15/264; F16F 15/265; F16F 15/223; F16F 15/26
See application file for complete search history.

(56) References Cited

U.S. PATENT DOCUMENTS 5,213,184 A 5/1993 Legouis et al.
8,020,528 B1* 9/2011 Phillips .............. F01M 11/0004
123/192.1
(Continued)

FOREIGN PATENT DOCUMENTS

DE 10053076 A1 5/2002
DE 102013210075 A1 12/2013
(Continued)

OTHER PUBLICATIONS

Examination Report for Great Britain Patent Application No. 1602826.8, dated Jul. 5, 2016, United Kingdom Intellectual Property Office, 7 pages.
(Continued)

Primary Examiner — Long T Tran
(74) Attorney, Agent, or Firm — Julia Voutyras; McCoy Russell LLP

(57) ABSTRACT

A balance assembly for an engine is provided. The balance assembly includes a first electric motor coupled to the engine and configured to rotate a first eccentric mass relative to the engine, the first eccentric mass being coupled to a first shaft of the first electric motor, and a second electric motor coupled to the engine and configured to rotate a second eccentric mass relative to the engine, the second eccentric mass being coupled to a second shaft of the second electric motor. The first and second electric motors are configured to rotate the first and second eccentric masses in order to balance a vibration characteristic of the engine.

20 Claims, 4 Drawing Sheets

(51) Int. Cl.
  *F02D 29/00*     (2006.01)
  *F16F 15/00*     (2006.01)
  *F16F 15/26*     (2006.01)
(52) U.S. Cl.
  CPC ............ *F16F 15/265* (2013.01); *F16F 15/28* (2013.01); *F02D 2250/28* (2013.01); *H05K 999/99* (2013.01)

(56) References Cited

U.S. PATENT DOCUMENTS

| | | | |
|---|---|---|---|
| 8,364,382 B2* | 1/2013 | Irisawa | F02D 13/0234 |
| | | | 123/319 |
| 9,255,623 B2* | 2/2016 | Yano | F02B 75/06 |
| 2008/0154468 A1 | 6/2008 | Berger et al. | |
| 2012/0275930 A1* | 11/2012 | Hideg | B60K 6/445 |
| | | | 417/53 |
| 2013/0312683 A1 | 11/2013 | Anton et al. | |

FOREIGN PATENT DOCUMENTS

| | | |
|---|---|---|
| FR | 2606110 A1 | 5/1988 |
| FR | 2845744 A1 | 4/2004 |
| JP | S58109744 A | 6/1983 |
| JP | 2004218697 A | 8/2004 |
| KR | 20030016677 A | 3/2003 |

OTHER PUBLICATIONS

European Patent Office, Office Action Issued in Application No. 17153662.6, dated Apr. 11, 2018, Netherlands, 7 pages.

* cited by examiner

ENGINE BALANCE ASSEMBLY USING ELECTRIC MOTORS

RELATED APPLICATIONS

This application claims priority to Great Britain Patent Application No. 1602826.8, filed on Feb. 18, 2016. The entire contents of the above-referenced application are hereby incorporated by reference in its entirety for all purposes.

TECHNICAL FIELD

The present disclosure relates to a balance assembly for an engine.

BACKGROUND AND SUMMARY

Internal combustion engines for vehicles, such as motor vehicles, are available in many different configurations, which may include different numbers and arrangements of cylinders, the cylinders having different ignition timings and/or ignition orders. Some engine configurations may lead to inherent imbalances in the forces exerted on the crank shaft of the engine during engine running. This can lead to reciprocating, rocking, or torsional vibrations of the crank shaft and/or engine.

Depending on the configuration of the engine, the vibrations may be first order, second order or higher order vibrations relative to the rotation of the engine crank shaft. Again, depending on the configuration of the engine, the severity of the vibrations may vary according to the running speed of the engine.

Many engines incorporate one or more balance shafts, comprising out-of-balance weights, which are driven by the engine to balance vibrations. It is often desirable to provide the out-of-balance weights such that they are separated by the greatest possible distance between them. Hence, it may be desirable for the balance shaft to extend substantially the entire length of the engine. However, the inventors herein have recognized that providing a balance shaft which extends through the engine introduces additional complexity to the construction of the engine, as such balance shafts may need to be adequately supported, lubricated, and driven synchronously with the engine. Additionally, the balance shaft itself many introduce packaging concerns for the engine.

According to an aspect of the present disclosure, there is provided a balance assembly for an engine. The balance assembly includes a first electric motor coupled to the engine and configured to rotate a first eccentric mass relative to the engine, the first eccentric mass being coupled to a first shaft of the first electric motor; and a second electric motor coupled to the engine and configured to rotate a second eccentric mass relative to the engine, the second eccentric mass being coupled to a second shaft of the second electric motor. The first and second electric motors are configured to rotate the first and second eccentric masses in order to balance a vibration characteristic of the engine and the first and second electric motors are provided on opposite longitudinal ends of the engine to each other.

In this way, two independent motors may be mounted onto the engine (e.g., on the cylinder block). Onto each motor is mounted an eccentric mass. The masses then rotate in concert with the engine crankshaft. This enables the deletion of expensive mechanical drives and disconnects the masses from the vehicle drive-train, which may have transferred error states. Further, by placing the motors and corresponding masses on opposite longitudinal ends of the engine, the masses may be located as far apart as possible, which increases system efficiency.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

DETAILED DESCRIPTION

Figure 1:
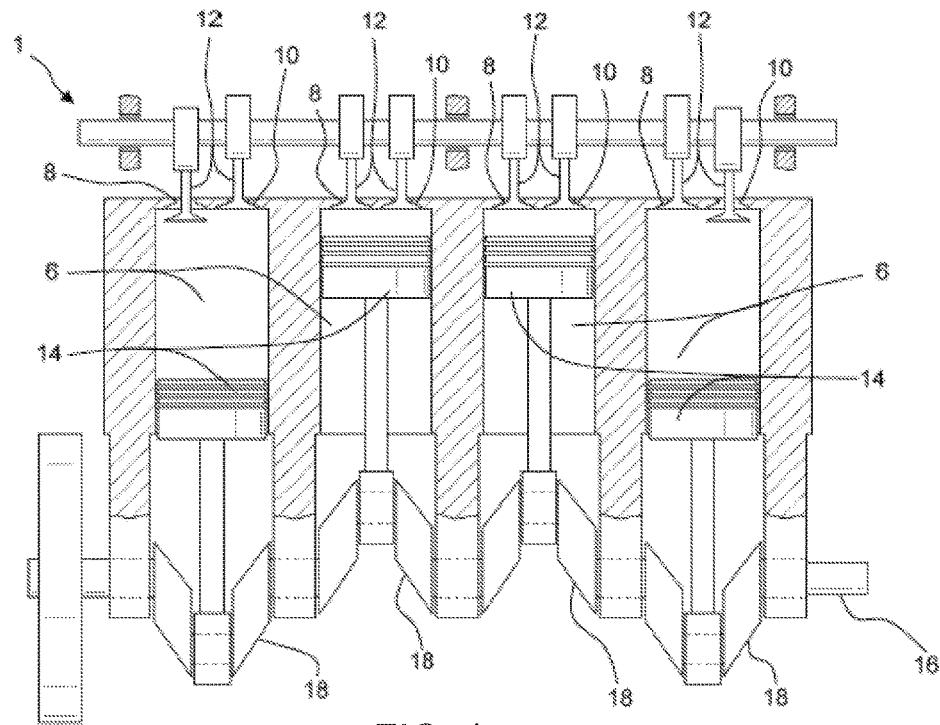
FIG. 1 is a sectional view of a previously proposed internal combustion engine.

Internal combustion engines (also referred to as ICEs or engines) typically generate vibrations that may lead to engine and/or other component degradation as well as operator dissatisfaction, and thus the engines may be equipped with balancer shafts. Conventional balancer shafts may utilize a drive mechanism, which may be gear-driven from the crankshaft of the engine. Such an approach utilizes a shaft, two balance masses, two drive gears, bearings, and lubrication, which adds cost and complexity to the engine, and generating a system which does not add noise to the engine may pose difficulties.

According to embodiments disclosed herein, two motor-driven eccentric masses may be coupled to the engine, and the speed, rotational direction, and/or phase angle of the motor shafts may be adjusted to provide effective balance across a variety of engine operating conditions. In certain engine configurations, such as inline three-cylinder engines, the effectiveness of the balance assembly at counteracting engine vibrations may be increased by operating the motor shafts in the reverse direction of the crankshaft at a speed equal to engine speed, and further by positioning the two masses as far apart as. Thus, the balance assembly disclosed herein may allow for reverse rotation (relative to the direction of engine rotation) at engine speed or another desired speed without the use of gears or mechanical drives, reducing the packaging space of the balance assembly.

The first and second electric motors may each comprise a rotary encoder, configured to determine respective phase angles of the shafts of the first and second electric motors. Additionally or alternatively, the rotary encoders may be configured to allow a difference in phase angle of the first and second electric motor shafts relative to a crank shaft of the ICE to be determined.

The phase angle of the shaft of each of the electric motors may be defined as the angle between a vertical direction and a line extending from a central axis of the shaft to the center of gravity of the eccentric mass coupled to the shaft. The phase angle of the crank shaft may be defined as the angle between a crank throw, e.g. a first crank throw, of the crank shaft and the vertical direction. The phase angle of each shaft, e.g. the crank shaft and the shafts of the first and second electric motors, may be positive in the direction of rotation of the shaft.

The angle, e.g. phase angle, of the crank shaft may be provided to the balance assembly by a crank position sensor. The ICE assembly may comprise the crank position sensor. At least one of the first and second electric motors may be configured to rotate in an opposite direction to the crank shaft. For example, the first and second electric motors may be configured such that the first and second eccentric masses rotate, relative to a housing of the engine, in a direction opposite to the direction of rotation of the crank shaft, relative to the engine housing. Alternatively, one or more of the eccentric masses may be rotated in the same direction as the crank shaft, relative to the engine housing. Accordingly, the first electric motor may rotate in a direction opposite to the direction of rotation of the second electric motor.

The first and second electric motors may be configured to maintain differences in phase angles between their respective shafts and the crank shaft, the differences in phase angles being substantially equal to predetermined values. Additionally or alternatively, the first electric motor and/or the second electric motor may be configured to maintain a predetermined difference in phase angle between the first and second electric motor shafts. For example, the first electric motor and/or the second electric motor may be configured to maintain a difference in phase angle of substantially 180 degrees between the first and second electric motor shafts.

The first and second electric motors may be configured to adjust a difference in phase angle between the first and second electric motor shafts and/or the crank shaft according to a variation in valve timing of the ICE. Additionally or alternatively, the first and second electric motors are configured to adjust a difference in phase angle between the first and second electric motor shafts and/or the crank shaft following a cylinder deactivation or activation event of the ICE.

The first and second electric motors may be configured to rotate at speeds substantially equal to a rotational speed of the crank shaft of the ICE. Alternatively, the first and second electric motors may be configured to rotate at speed substantially equal to twice the rotational speed of the crank shaft of the ICE. Alternatively again, the first and second electric motors may be configured to rotate at speed substantially equal to another multiple or fraction of the rotational speed of the crank shaft of the ICE The first and second electric motors may be provided on opposite ends of the engine to each other. The first and second electric motors may be provided, e.g. arranged, such that the first and second electric motor shafts are axially aligned.

The first and/or second electric motors may be coupled to one or more housings of the ICE, such as a cylinder head, a cylinder block, and/or a crank case. The first and/or second electric motors may be provided within cavities defined by the one or more housings of the ICE. For example, the first and/or second electric motors may be provided within a crank case, e.g. in the sump. The first and/or second electric motors may be provided within a sealed unit, e.g. to prevent the ingress of oil into the motor. Alternatively, the first and second electric motors may be coupled to an external surface of one or more of the engine housings, e.g. the first and/or second electric motors may be mounted externally to the engine.

The first and second electric motors may be configured to rotate the first and second eccentric masses respectively, when the ICE is operating at or above a threshold running speed. In other words, the first and second electric motors may be configured not to rotate the first and second eccentric masses when the ICE is operating below a threshold running speed.

The balance assembly may be configured to balance a first order vibration of the engine. Additionally or alternatively, the balance assembly may be configured to balance a second order vibration of the engine. Again additionally or alternatively, the balance assembly may be configured to balance a vibration at a frequency of any other multiple or fraction of the engine running speed.

The balance assembly may further comprise a controller configured to control the operation of the first and second electric motors.

The balance assembly may further comprise a third electric motor coupled to the ICE and configured to rotate a third eccentric mass relative to the ICE, the third eccentric mass being coupled to a shaft of the third electric motor. The balance assembly may further comprise a fourth electric motor coupled to the ICE and configured to rotate a fourth eccentric mass relative to the ICE, the fourth eccentric mass being coupled to a shaft of the fourth electric motor. The third and fourth electric motors may each be configured to rotate the third and fourth eccentric masses in a direction opposite to the direction of rotation of the first and second electric motors respectively.

The third and fourth electric motors may be provided such that the third and fourth electric motor shafts are axially aligned with each other. The third and fourth electric motors may be offset, e.g. axially offset, from the first and/or second electric motor shafts. For example, the first and second electric motors may be provided above the crank shaft of the engine and the third and fourth electric motors may be provided below the crank shaft. Alternatively, each of the electric motors may be provided above or below the crank shaft, and the first and second electric motors may be laterally offset from the third and fourth electric motors. Alternatively again, each of the electric motors may be axially offset from each of the other electric motors.

The third and fourth electric motors may each comprise a rotary encoder, configured to determine respective phase angles of the shafts of the third and fourth electric motors. The third and fourth electric motors may be configured to rotate at speeds substantially equal to twice a rotational speed of a crank shaft of the ICE.

Any of the features mentioned in relation to the first and second electric motors may apply equally to the third and fourth electric motors.

The internal combustion engine may be a variable displacement engine, e.g. in which one or more cylinders of the engine may be selectively deactivated. Additionally or alternatively, the internal combustion engine may be capable of variable valve timing for one or more of the cylinders.

According to another aspect of the present disclosure, there is provided a method of balancing vibrations of an Internal Combustion Engine (ICE) assembly, the ICE assembly comprising an ICE and a balance assembly, the balance assembly comprising: a first electric motor coupled to the ICE and configured to rotate a first eccentric mass relative to the ICE, the first eccentric mass being coupled to a shaft of the first electric motor; and a second electric motor coupled to the ICE and configured to rotate a second eccentric mass relative to the ICE, the second eccentric mass being coupled to a shaft of the second electric motor; and wherein the first and second electric motors are provided on opposite longitudinal ends of the engine to each other. The method comprises: driving the first and second electric motors to rotate the first and second eccentric masses to balance a vibration characteristic of the ICE.

The method may further comprise: determining a running speed of the engine. The first and second electric motors may be driven when the engine is running at a speed above a threshold value. Additionally or alternatively, the method may comprise: deactivating the first and/or second electric motor if the engine running speed is below a threshold value.

The method may further comprise: determining a variation in valve timing of the ICE; and controlling the operation of the first and/or second electric motor to adjust a difference in phase angle between the first and/or second electric motor shafts and/or the crank shaft.

The ICE may comprise two or more cylinders. The method may comprise determining a cylinder deactivation or reactivation of the ICE. The vibration characteristic of the engine may vary according to the number and/or arrangement of activated and/or deactivated cylinders, which may alter the balancing desired from the balance assembly. The method may further comprise controlling the operation of the first and/or second electric motor to adjust a difference in phase angle between the first and/or second electric motor shafts and/or the crank shaft.

The method may comprise determining a cylinder deactivation or reactivation of the ICE. The method may further comprise controlling the operation of the first and/or second electric motor to adjust a speed of rotation of the first and/or second eccentric masses.

According to another aspect of the present disclosure, there is provided a vehicle comprising the ICE assembly according to a previously mentioned aspect of the disclosure.

With reference to FIG. 1, an engine 1, e.g. for a motor vehicle, may comprise one or more engine housings, such as a cylinder block 2 and a cylinder head 4. The cylinder block 2 may define one or more cylinders 6 and the cylinder head may define an inlet port 8 and an exhaust port 10 for each of the cylinders 6. Valves 12 may be provided at each of the inlet ports 8 and exhaust ports 10 to control the flow of inlet and exhaust gases into and out of the cylinders 6 respectively.

The engine 1 may further comprise a piston 14 provided within each of the cylinders 6. During operation of the engine, movement of the pistons 14 may act to draw inlet air into the cylinders 6. Fuel may be mixed with the inlet air in each of the cylinders. The mixture of fuel and air may then be compressed by the pistons 14 before being combusted to produce expanding combustion gases. The expanding combustion gases act on the pistons 14 to drive the pistons within the cylinder 6 and turn a crank shaft 16 of the engine. The action of the pistons may then force the combustion gases from the cylinders through the exhaust ports 10.

The pistons 14 may be coupled to the crank shaft 16 via crank throws 18, which extend radially from a central axis of the crank shaft, about which the crank shaft 16 rotates. The crank throws 18 may each extend from the crank shaft 16 in substantially the same radial direction as each other. Alternatively, as depicted in FIG. 1, two of the crank throws 18 may be angularly offset from the other crank throws. In alternative arrangements (not shown), each of the crank throws 18 may be angularly offset from each of the others.

Arranging the crank throws 18 to extend from the crank shaft 16 at different angles results in the combustion of fuel and air within the cylinders driving the pistons 14 at different points during the rotation of the crank shaft 16. The angles of the crank throws 18 may be adjusted to alter the timings of the combustion events. Additionally, as shown in FIG. 1, although two of the pistons 14 are located at a top dead center position, due to the timing of the opening and closing of the valves 12, and/or the injection of fuel into the cylinders 6, only one of the cylinders 6 may contain a mixture of inlet air and fuel ready for combustion. The ordering with which the cylinders are fired can therefore be determined by adjusting the timings with which the valves 12 are opened and closed, and/or the fuel is injected.

In addition to the forces caused by the combustion of fuel within the cylinders 6, as the pistons 14 reciprocate, forces are applied to the crank shaft 16 due to the inertias of the pistons 14. The force exerted due to each piston may be out of balance with forces acting on the crank shaft due to the other pistons. The forces may therefore produce vibrations of the crank shaft 16, such as reciprocating, oscillating, rocking and/or, torsional vibrations.

The mode and/or magnitude of the vibrations may depend on the number and/or arrangement of the pistons 14 provided in the engine 1. Additionally, the relative timings of the movements of the pistons 14 and/or the order in which the cylinders 6 are fired may affect the vibration induced in the crank shaft 16.

The vibrations induced in the crank shaft 16 may be at substantially the same frequency as the engine running speed, e.g. they may be first order vibrations. Alternatively, the vibrations induced in the crank shaft 16 may be half, twice, or three times the frequency of the crank shaft rotation or any other fraction or multiple thereof. The vibrations of the engine 1 may comprise multiple components at different frequencies relative to the engine running speed. The frequency of vibrations may depend on the number and/or arrangement of the cylinders 6, and/or on the relative timings of the movements of the pistons 14 and/or the order in which the cylinders 6 are fired. For example, in the arrangement shown in FIG. 1, the movement of the pistons 14 may induce a vibration in the crank shaft at a frequency of twice the rotation speed of the crank shaft, e.g. a second order vibration.

The engine 1 described above with reference to FIG. 1 is a previously proposed engine. However, the description of each of the features of the engine 1 may apply equally to the engine provided within the engine assembly 50, according to the present disclosure, described below.

Figure 2:
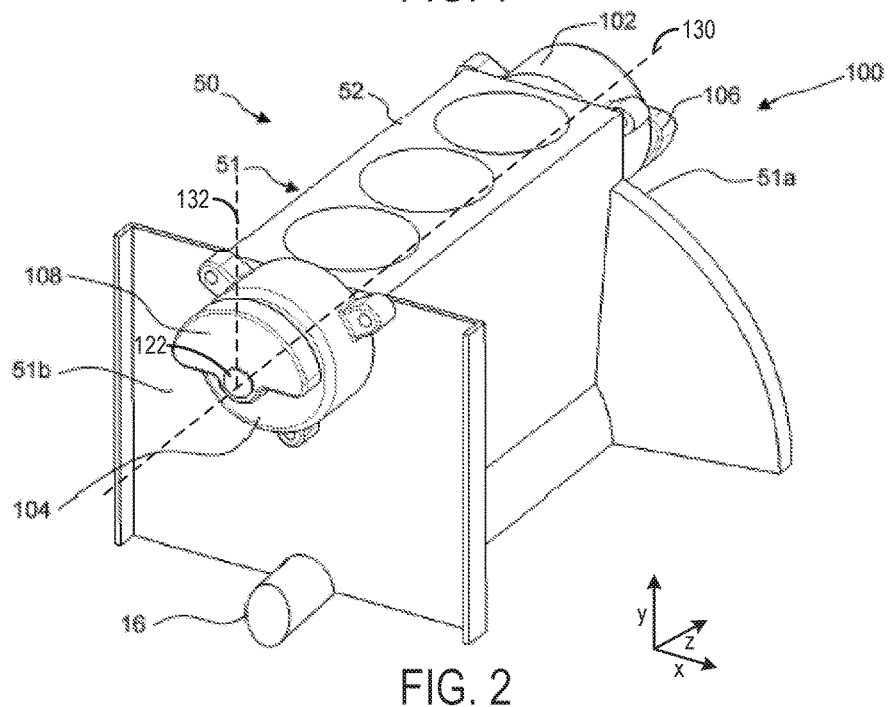
FIG. 2 is a perspective view of an engine housing and a balance assembly according to arrangements of the present disclosure.
Figure 3:
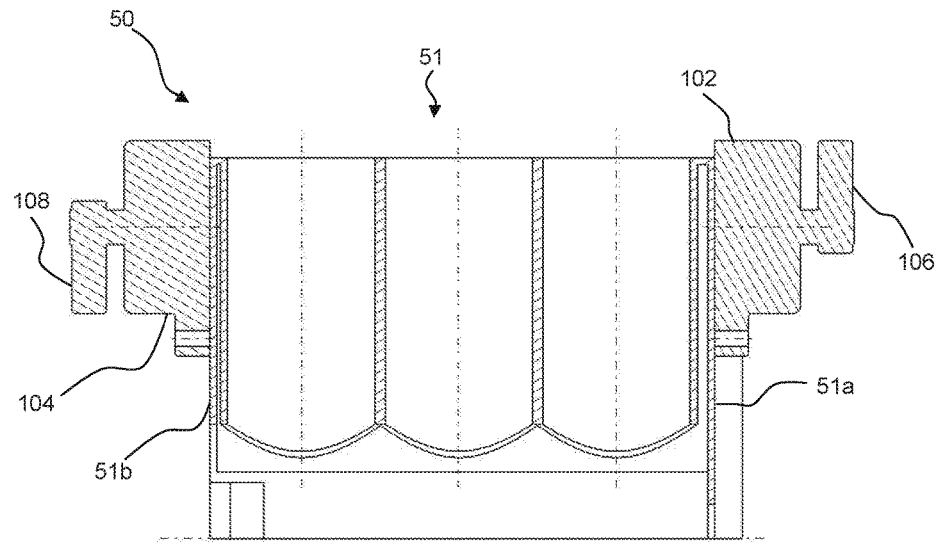
FIG. 3 is a sectional view of an engine housing and a balance assembly according to arrangements of the present disclosure.
Figure 4:
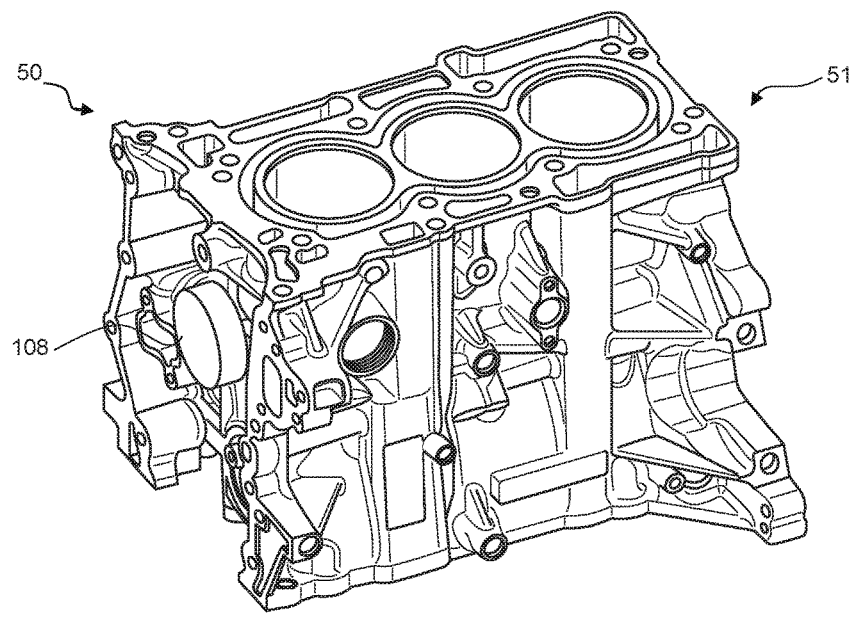
FIG. 4 is a perspective view of an engine housing and a balance assembly according to arrangements of the present disclosure.

With reference to FIGS. 2 to 4, in order to balance out vibration of the crank shaft, an engine assembly 50, according to arrangements of the present disclosure, may comprise a balance assembly 100. Although the engine 51 provided within the engine assembly 50 depicted in FIGS. 2 to 4 comprises three cylinders, it is equally envisaged that the present disclosure could be applied to an engine comprising any number of cylinders, such as three or four cylinders inline. Similarly, although on the engine 51 depicted in FIGS. 2 to 4, the cylinders 6 are provided inline, e.g. with central axes of each of the cylinders being parallel, it is equally envisaged that the cylinders of the engine may be provided in other arrangements in which the central axes of one or more of the cylinders are angularly offset from one or more of the other cylinders, such as V arrangements or W arrangements. For example, the engine may comprise a V6 or V8 engine or a W16 engine.

The balance assembly 100 may comprise a first electric motor 102 and a second electric motor 104. The electric motors may be configured to rotate first and second eccentric masses 106, 108 coupled to shafts of the first and second electric motors 102, 104 respectively (second shaft 122 of second electric motor 104 is illustrated in FIG. 2). The first and second electric motors may be configured to rotate the first and second eccentric masses 106, 108 such that a vibration characteristic of the engine 51 is balanced. The first and second eccentric masses may each have a center of gravity that is offset from the central axis of rotation of the shaft to which it is attached.

As shown in FIGS. 2 to 4, the first electric motor 102 may be provided at a first end 51a of the engine and the second electric motor 104 may be provided at a second end 51b of the engine. The first and second ends 51a, 51b of the engine 51 may be opposite to each other and may be spaced apart in a longitudinal direction of the engine (e.g., spaced apart along the longitudinal axis of the engine, which is parallel to the line 130 and the z axis of FIG. 2). The electric motors may be coupled to the engine, e.g. directly to one or more housings of the engine. However, it is equally envisaged that one or both of the electric motors 102, 104 may be coupled to a cover of the engine (not shown).

With reference to FIG. 4, the electric motors 102, 104 may be provided on the engine such that the eccentric masses 106, 108 are provided within cavities defined by the engine housings and one or more covers of the engine (not shown).

In the arrangement shown in FIGS. 2 to 4, the first and second electric motors 102, 104 are arranged such that their shafts are substantially aligned, e.g. axially aligned. Additionally, the shafts of the first and second electric motors are substantially parallel to the crank shaft 16. As depicted in FIGS. 2 to 4, the shafts of the first and second electric motors 102, 104 may be offset from the central axis of the crank shaft 16. However it is equally envisaged that the shafts of the first and second electric motors 102, 104 may be substantially aligned with the central axis of the crank shaft 16 In other arrangements (not shown) the shafts of the first and second electric motors 102, 104 may be offset from each another. For example, the first electric motor 102 may be provided on the engine 51 at a location above the crank shaft 16 and the second electric motor 104 may be provided at a location below the crank shaft 16. In some arrangements, the shafts of the first and/or second electric motors 102, 104 may not be parallel to each other and/or may not be parallel to the crank shaft 16.

In order to ensure vibrations of the engine 51 are suitably balanced, it may be desirable for each of the eccentric masses 106, 108 to be rotated at substantially the same speed as the crank shaft 16 of the engine 51. One or more of the electric motors 102, 104 may be configured to rotate in a direction opposite to the direction of the crank shaft 16. For example, in the arrangement depicted in FIGS. 2 to 4, the first and/or second electric motors are configured to rotate such that the first and second masses rotate relative to the engine housing 52 in a direction opposite to the direction of rotation of the crank shaft 16 relative to the engine housing 52.

A phase angle may be defined for each of the shafts of the first and second electric motors and the crank shaft of the engine, which defines the angular position of each of the shafts. The phase angle of the shafts of the first and second electric motors 102, 104 may be defined as the angle between a vertical direction (shown by line 132, which is parallel to the y axis of the coordinate system shown in FIG. 2) and a line extending from a central axis of the shaft (shown by line 130, which is parallel to the z axis of the coordinate system of FIG. 2) to the center of mass of the eccentric mass coupled to the shaft. For example, in the arrangement depicted in FIG. 2, the phase angle of the shaft of the first electric motor 102 is 180 degrees and the phase angle of the shaft of the second electric motor 104 is 0 degrees.

The phase angle of the crank shaft 16 may be defined as the angle between the vertical direction and the angle of one of the crank throws 18, e.g. the first crank throw. For example, in the arrangement depicted in FIG. 1, the phase angle of the crank shaft is 180 degrees.

It may be desirable for differences between the phase angles of each of the shafts of the first and second electric motors 102, 104 and the crank shaft 16 to be substantially equal to predetermined values. For example, it may be desirable for the first electric motor 102 to rotate with a phase angle difference of 0 degrees relative to the crank shaft 16 and for the second electric motor 104 to rotate with a phase angle difference of 180 degree relative to the crank shaft 16. Additionally or alternatively, it may be desirable for the difference in the phase angle between the shafts of the first and second electric motors to be substantially equal to a predetermined value, such as 180 degrees.

Figure 5:
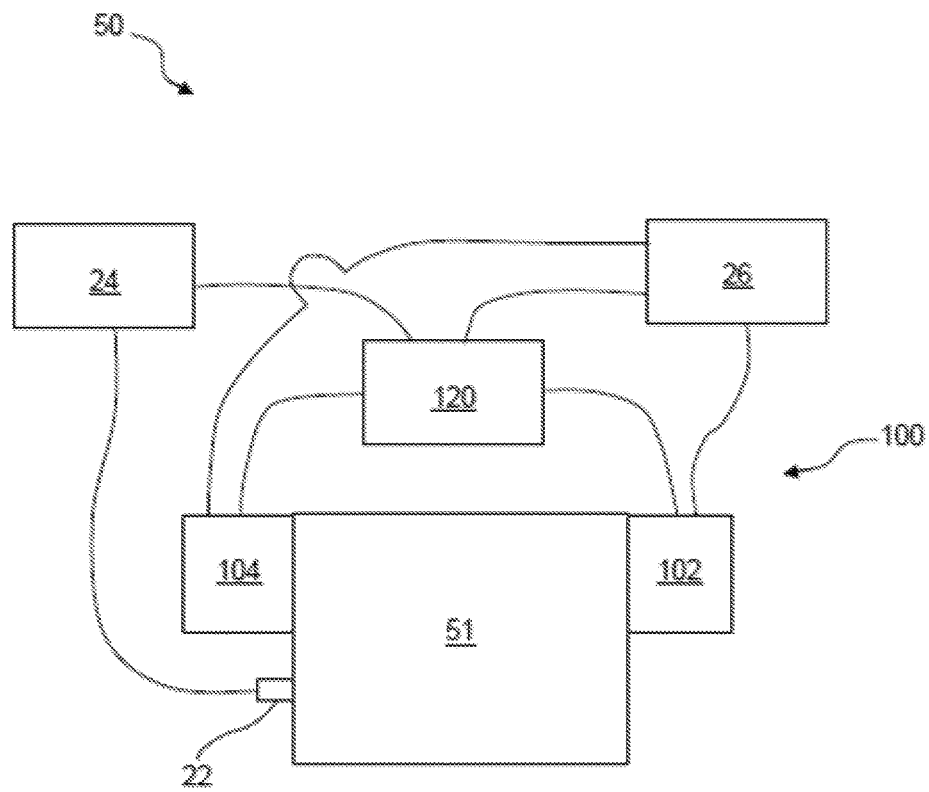
FIG. 5 is a schematic view of an internal combustion engine assembly comprising a balance assembly, according to arrangements of the present disclosure.

With reference to FIG. 5, the engine assembly 50 may comprise a controller 120 configured to control the speed and/or phase angle of the electric motors 102, 104. The controller 120 may be configured to maintain the rotational speed of each shaft of the first and second electric motors 102, 104 and/or the differences in phase angle between each of the shafts and/or the crank shaft 16, such that they are substantially equal to predetermined values. In some arrangements, the first and/or second eccentric masses 106, 108 may be rotated in an opposite direction to the crank shaft 16. In such cases, the phase angle of the first and/or second shaft may be defined in the direction in which they are rotating.

Each of the electric motors 102, 104 may comprise a rotary encoder (not shown), which may be configured to determine an angle of rotation of the shaft of the electric motor 102, 104. The rotary encoders may be incremental or absolute encoders. The rotary encoders may allow the angle of the shaft of each of the electric motors 102, 104 to be determined to an accuracy of 15 degrees or better, e.g. 24 steps for each revolution of the shaft. In another arrangement the rotary encoders may have an accuracy of 1.5 degrees or better, e.g. 240 steps for each revolution of the shaft. The controller 120 may determine a phase angle and/or rotational speed of each of the electric motors 102, 104 by referring to the rotary encoders.

The engine assembly 50 may comprise a crank position sensor 22 configured to determine an angle of the crank shaft 16. The controller 120 may determine the phase angle and/or rotational speed of the crank shaft 16 by referring to signals received from the crank position sensor. In some arrangements, the crank position sensor may be coupled to an ECU 24. The ECU 24 may receive signals from the crank position sensor 22 and may send signals to the controller 120 indicating the phase angle and/or rotational speed of the crank shaft 16. In some examples, the controller 120 and ECU 24 may be separate devices that are communicatively coupled. In other examples, the controller 120 and ECU 24 may comprise a single device, e.g., the controller 120 may be a module of the ECU 24.

As described above, the vibration of the engine 51 may vary according to timings of the movements of each of the pistons 14, as well as the timing of the inlet and exhaust valves 12 of each of the cylinders 6, which may affect the timing and/or order in which each of the cylinders 6 is fired. Accordingly, if the timing of the inlet and/or exhaust valves 12 varies, it may be desirable to adjust the difference in phase angle between the shafts of the first and second electric motors 102, 104 and/or the difference in phase angle between each of the shafts and the crank shaft 16. The controller 120 may therefore be configured to determine a variation in the valve timing of the engine 51, for example the controller 120 may receive information from the ECU 24 indicating a variation in the valve timing. The controller 120 may be configured to control the operation of the first and second electric motors 102, 104 to adjust the phase angles of their respective shafts appropriately, in order to continue balancing vibrations of the engine 51.

In order to improve the efficiency of the engine 51 under certain running conditions, one or more cylinders 6 of the engine may be selectively deactivated, e.g. fuel may not be mixed with inlet air within the one or more cylinders 6, and the one or more cylinders 6 may not be fired. For example, one of the cylinders in a three cylinder engine, such as an inline 13 engine, may be selectively deactivated. In other words, the balance assembly of the present disclosure may be applied to a Variable Displacement Engine (VDE). Deactivation of the one or more cylinders 6 may be performed in addition to or separately from adjusting the timing of the inlet and/or exhaust valves 12 of the engine 51. Deactivating one or more cylinders 6 of the engine may affect the vibration of the engine 51, and hence, it may be desirable to adjust the operation of the first and second electric motors 102, 104 in order to continue balancing vibrations of the engine 51. For example, in some arrangements, it may be desirable to adjust the speed of rotation of the first and/or second electric motors 102, 104, e.g. relative to the speed of rotation of the crank shaft 16. Additionally or alternatively, it may be desirable to adjust a difference in phase angle of the shafts of the electric motors 102, 104 relative to each other and/or relative to the crank shaft 16 of the engine 51.

If the rotational speed of the first and/or second electric motor 102, 104 is adjusted, such that it is not substantially equal to the engine running speed, the difference in phase angle between the shaft of the first and/or second electric motor 102, 104 and the crank shaft 16 will vary during the rotation of the shaft. In this case, the controller 120 may control the operation of the first and/or second electric motor such that the difference in phase angle is substantially equal to the predetermined value at a predetermined point in the rotation of the crank shaft 16, such as when a first crank throw 18 is substantially aligned with the vertical direction, e.g. the phase angle of the crank shaft 16 is 0 degrees.

For some configurations of engine assembly 50, e.g. according to the number of cylinders 6, the arrangement and/or timing of the pistons 14, cylinders 6 and/or valves 12, the magnitudes of vibrations of the engine 51 may be dependent on the rotational speed of the crank shaft 16. For such configurations of engine 51, it may be desirable to refrain from operating the first and second electric motors 102, 104 when the engine is operating below a predetermined threshold running speed, in order to reduce the power consumption of the balance assembly 100. The controller may therefore by configured to determine the running speed of the engine 51 and may deactivate the first and/or second electric motor 102, 104 if the engine is running below the predetermined threshold running speed.

When the engine running speed increases above the predetermined threshold, the first and/or second electric motors 102, 104 may be activated. The speed of the first and/or second electric motors may be increased to become substantially equal to the engine running speed or any desirable multiple or fraction thereof. The first and/or second electric motors 102, 104 may be controlled to adjust the phase angles of the first and/or second electric motor shafts such that differences in the phase angle between the first and/or second electric motor shafts and the crank shaft 16 are substantially equal to predetermined values. For example, the speed of the first and/or second electric motors may be increased (or decreased) for a period of time, e.g. to become greater than (or less than) the rotational speed of the crank shaft 16, in order to adjust the difference in phase angle between the first and/or second electric motor shafts and the crank shaft 16.

As depicted in FIG. 5, the first and second electric motors 102, 104 and/or the controller 120 may be coupled to an electrical system 26 of the vehicle, and may receive power from the electrical system 26 to drive the electric motors 102, 104 and/or operate the controller. However, in alternative arrangements, the balance assembly 100 may comprise a power supply, such as a battery, configured to provide power to the electric motors 102, 104 and/or the controller 120.

It is also envisaged that in some arrangements of the present disclosure, the balance assembly may further comprise third and fourth electric motors configured to rotate third and fourth eccentric masses respectively. Providing third and fourth electric motors may allow the balance assembly according to the present disclosure to balance vibrations in engines which otherwise typically comprise a pair of balance shafts to balance vibrations, such as four cylinder engines.

Any of the features mentioned above in relation to the first and second electric motors may apply equally to the third and fourth electric motors. In particular, the third and fourth electric motors may be arranged relative to each other in a similar way to the first and second electric motors, as described above. For example, the third electric motor may be provided at the first end 51*a* of the engine and the fourth electric motor may be provided at the second end 51*b* of the engine, or vice versa. The third and fourth electric motors may be arranged such that their shafts are substantially aligned, e.g. axially aligned. The features referring to relative conditions of the first and second electric motors and/or their shafts, such as their phase angles and/or speeds may be equally applicable to the relative conditions of the third and fourth electric motors.

In some arrangements, the third and fourth electric motors may be configured to rotate in the same direction as the first and second electric motors respectively. However, in other arrangements, it may be desirable for the third and fourth electric motors to rotate in the opposite direction relative to the first and second electric motors, e.g. relative to the engine.

When the balance assembly comprises third and fourth electric motors, it may be desirable for each of the electric motors to rotate at the same speed as the crank shaft 16 of the engine. Alternatively, it may be desirable for the electric motors to rotate at twice the rotational speed of the crank shaft 16.

As described above, it may be desirable to vary the speed and/or phase angle of the electric motors relative to the crank shaft 16 and/or the other electric motors, according to the rotational speed of the crank shaft. Additionally, it may be desirable to deactivate one or more of the electric motors when the engine is running below the predetermined threshold running speed. When the balance assembly comprises the third and/or fourth electric motors, it may be desirable to deactivate the third and/or fourth electric motors when the engine is operating below the same predetermined threshold running speed. Alternatively, it may be desirable to deactivate the third and/or fourth electric motors when the engine is operating below a further predetermined threshold running speed. The further predetermined threshold running speed may be higher or lower that the predetermined threshold.

Additionally, when the engine assembly comprises third and fourth electric motors, it may be desirable to activate or deactivate the third and/or fourth electric motors according to the number of cylinders of the engine that are currently active. For example, if the engine comprises four cylinders, it may be desirable to operate the third and fourth electric motors whilst the engine is operating with all four cylinders active and to deactivate the third and fourth electric motors when one or more cylinders is deactivated. In some arrangements, the third and fourth electric motors may be reactivated when further, e.g. more than one, cylinder is deactivated.

It is also envisaged that it may be desirable to provide more than four electric motors within the balance assembly. Additional electric motors may be provided in pairs and may be arranged relative to each other in the same way as the first and second, and third and fourth electric motors. Alternatively, additional electric motors may be provided individually. The features described above in relation to the first, second, third and fourth electric motors may apply equally to any additional electric motors provided within the balance assembly.

Figure 6:
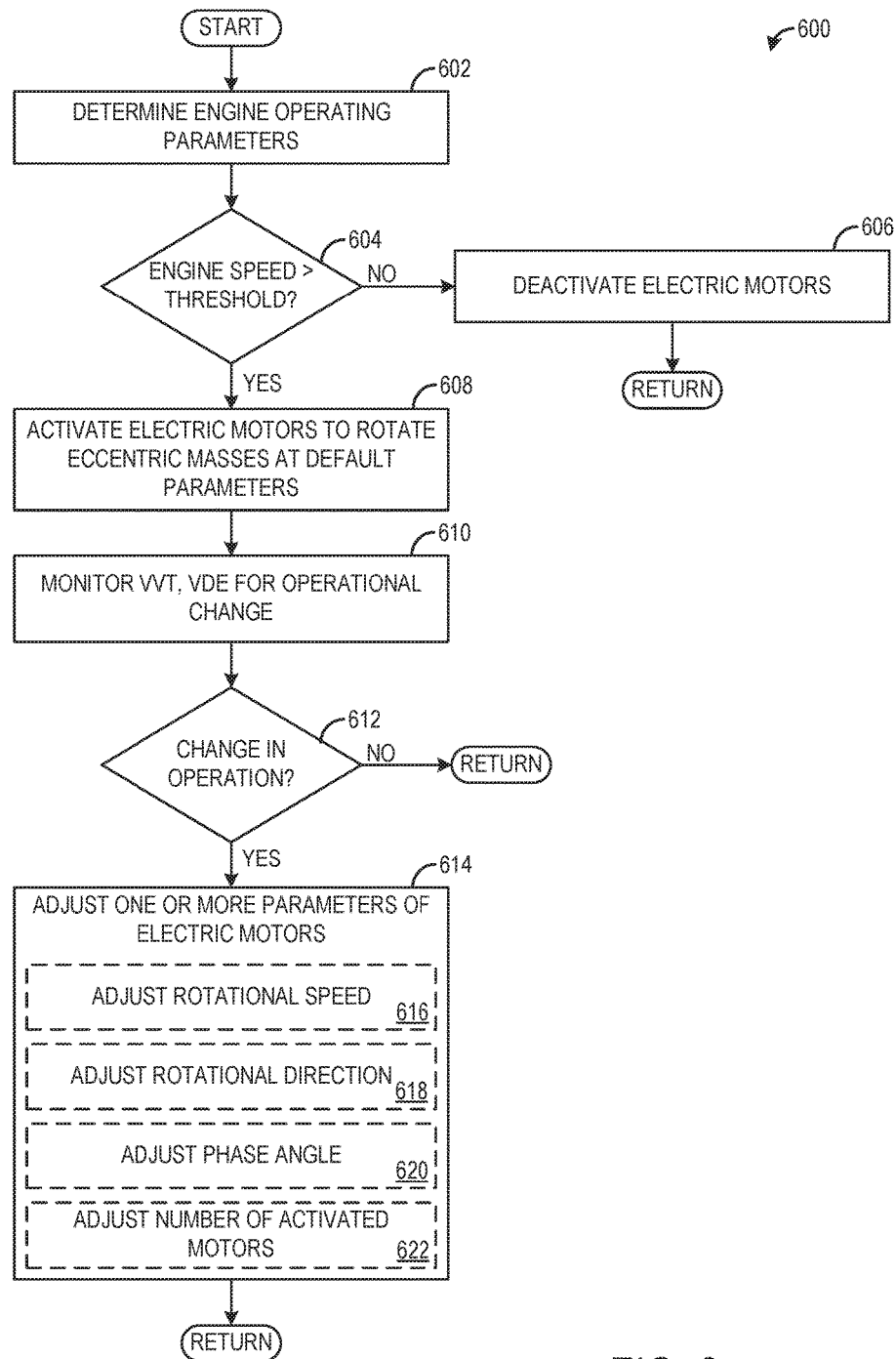
FIG. 6 is a flow chart illustrating a method for operating a balance assembly according to arrangements of the present disclosure.

FIG. 6 is a flow chart illustrating a method 600 for controlling a balance assembly coupled to an engine, such as the balance assembly described above with respect to FIGS. 2-5. Instructions for carrying out method 600 may be executed by a controller, for example, the controller 120 and/or ECU 24 of FIG. 5, based on instructions stored on a memory of the controller and in conjunction with signals received from sensors of the engine system, such as the sensors described above with reference to FIG. 5 (e.g., crank sensor, rotary encoders). The controller may employ engine actuators of the engine system to adjust engine operation, according to the methods described below.

At 602, method 600 includes determining operating parameters. The determined operating parameters may include, but are not limited to, engine speed, engine load, intake and/or exhaust valve timing, cylinder activation status, and other parameters. At 604, method 600 includes determining if engine speed is greater than a threshold speed. The threshold engine speed may be relatively low, such as at or near idle engine speeds (e.g., 500 RPM). If engine speed is not above the threshold speed, for example if the engine is operating in order to propel the vehicle in which it is installed, method 600 proceeds to 606 to deactivate the motors of the balance assembly (e.g., motors 102 and 104). By deactivating the motors during low engine speed where engine vibrations may be minimal, excessive energy usage and/or battery depletion via operation of the motors may be avoided. Method 600 then returns.

If engine is above the threshold speed, method 600 proceeds to 608 to activate the electric motors and operate the motors according to default parameters. For example, two electric motors may be activated, and each motor may be operated to rotate a respective shaft in a first direction (e.g., opposite a direction of rotation of the crankshaft of the engine) at a first rotational speed (e.g., equal to engine speed). As the shafts that are coupled to the eccentric masses are not engine-driven, the controller may include instructions for determining engine speed based on feedback from an engine speed sensor, for example, or via information sent from the ECU, and the controller may include instructions for operating the motors to rotate the shafts at the received/determined engine speed (e.g., by controlling a duty cycle of each motor). Further, each motor may be controlled to have a given phase angle with respect to the other motor and/or engine crankshaft.

At 610, method 600 includes monitoring for engine operational changes, including changes in variable valve timing (VVT) or variable camshaft timing and changes in variable displacement engine (VDE) mode, such as cylinder activation or deactivation. The operation of the VVT and VDE may be monitored by monitoring sensor data and/or information output by the ECU (e.g., engine load, fuel injection status, commanded valve timing, camshaft position, and intake and/or exhaust valve position).

At 612, method 600 determines if an operational change is detected. If no changes are detected, method 600 returns. In some examples, when the method returns, the method may continue to monitor for engine speed changes (and deactivating the motors if the engine speed drops below the threshold) and other engine operational changes.

If an operational change is detected, method 600 proceeds to 614 to adjust one or more parameters of the electric motors. The one or more parameters that may be adjusted include the rotational speed of the activated motors, as indicated at 616. For example, the speed may be adjusted to match engine speed, or the speed may be adjusted to be half of or twice the engine speed. The one or more parameters that are adjusted by include the rotational direction of the activated motors, as indicated at 618. For example, the motors may be adjusted from a first rotational direction (e.g., opposite the rotational direction of the crankshaft) to rotate in a second rotational direction (e.g., the same rotational direction of the crankshaft). The one or more parameters that may be adjusted may include the phase angle of the motor shaft relative to another motor shaft and/or the crankshaft, as indicated at 620. For example, one or more of the motors (e.g., the first motor) may be adjusted such that it maintains a 180 degree phase shift from another motor (e.g., the second motor). Further, adjusting the one or more parameters may include adjusting which and/or how many motors are activated, as indicated at 622. For example, the balance assembly may include four motors, and only two motors may be initially activated. Then, as operational parameters of the engine change, additional motors may be activated.

The parameter(s) of the electric motors that may be changed may be based on the type and/or intensity of the operational change. For example, a change in engine speed may cause a change in motor shaft rotational speed, while a change in cylinder activation status (e.g., shifting from three cylinder operation to two cylinder operation) may result in both shaft rotational speed adjustment and shaft phase angle adjustment.

In some examples, the controller may store a look-up table that indexes motor parameters to engine parameters, and the controller may adjust motor operation according to the look-up table. For example, motor/shaft rotational speed may be indexed to engine speed, shaft phase angle may be indexed to cylinder status (e.g., three vs. two cylinder operation), etc. In this manner, the controller may approximate engine vibrations based on engine operating conditions such as speed, load, and cylinder status and select balance assembly operating parameters according to the approximated engine vibrations. In other examples, the controller may be configured to analyze engine vibrations in real time based on output from an engine vibration sensor (e.g., accelerometer, crankshaft speed sensor). For example, the controller may include instructions to process the sensor output to convert the output from the time domain to the frequency domain and identify a magnitude of a peak corresponding to first order vibrations and a magnitude of a peak corresponding to second order vibrations. Based on the magnitude(s) of the peak(s), balance assembly operation may be adjusted. For example, if the first order peak is larger than the second order peak, a first set of balance assembly parameters (e.g., rotational speed, direction, phase angle) may be selected that is predicted to sufficiently counteract first order vibrations. If the second order peak is higher than the first order peak, a second set of balance assembly parameters may be selected that is predicted to sufficiently counter second order vibrations.

The technical effect of balancing engine vibrations by activating one or more electrical motors coupled to an eccentric mass and to an engine is reducing engine noise, vibration, and harshness, thus reducing the risk of engine degradation and increasing operator satisfaction, while minimizing system cost and complexity.

An example provides a method for operating a balance assembly of an engine. The method may include activating a first electric motor and a second electric motor responsive to engine speed exceeding a threshold speed, the first electric motor rotating a first eccentric mass positioned on a first end of an engine, the second electric motor rotating a second eccentric mass positioned on a second end of the engine; and adjusting one or more parameters of the first electric motor responsive to a change in engine operation. In an example, the first electric motor and the second electric motor may be deactivated responsive to engine speed below the threshold speed. In an example, adjusting one or more parameters of the first electric motor responsive to the change in engine operation comprises adjusting one or more of a rotational speed, a rotational direction, and a phase angle of the first electric motor, the phase angle relative to the second electric motor and/or a crankshaft of the engine. In an example, the change in engine operation may include one or more of a change in engine speed, a change in intake and/or exhaust valve timing, and a change in cylinder activation.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A balance assembly for an engine, comprising:
a first electric motor coupled to the engine and configured to rotate a first eccentric mass relative to the engine, the first eccentric mass being coupled to a first shaft of the first electric motor; and
a second electric motor coupled to the engine and configured to rotate a second eccentric mass relative to the engine, the second eccentric mass being coupled to a second shaft of the second electric motor;
wherein the first and second electric motors are configured to rotate the first and second eccentric masses in order to balance a vibration characteristic of the engine; and
wherein the first and second electric motors are provided on opposite longitudinal ends of the engine to each other.

2. The balance assembly according to claim 1, wherein the first electric motor comprises a first rotary encoder configured to determine a phase angle of the first shaft of the first electric motor and the second electric motor comprises a second rotary encoder configured to determine a phase angle of the second shaft of the second electric motor.

3. The balance assembly according to claim 1, further comprising a controller configured to determine a difference in phase angle of the first and/or second shafts relative to a crank shaft of the engine.

4. The balance assembly according to claim 3, wherein the controller is configured to maintain differences in phase angles between the first and/or second shafts and the crank shaft of the engine, the differences in phase angles being equal to predetermined values.

5. The balance assembly according to claim 3, wherein the controller is configured to maintain a predetermined difference in phase angle between the first and second shafts.

6. The balance assembly according to claim 3, wherein the controller is configured to maintain a difference in phase angle of 180 degrees between the first and second shafts.

7. The balance assembly according to claim 1, further comprising a controller configured to adjust a difference in phase angle between the first and second shafts and/or a crank shaft of the engine according to a variation in valve timing of the engine.

8. The balance assembly according to claim 1, further comprising a controller configured to adjust a difference in phase angle between the first and second shafts and/or a crank shaft of the engine following a cylinder deactivation or activation event of the engine.

9. The balance assembly according to claim 1, wherein the first and second electric motors are configured to rotate at speeds equal to a rotational speed of a crank shaft of the engine.

10. The balance assembly according to claim 1, wherein the first and second electric motors are configured to rotate at speeds equal to twice a rotational speed of a crank shaft of the engine.

11. The balance assembly according to claim 1, wherein the first and/or second electric motors are provided within cavities defined by one or more housings of the engine.

12. The balance assembly according to claim 1, wherein the first and second electric motors are configured to rotate the first and second eccentric masses respectively, responsive to the engine operating above a threshold running speed.

13. The balance assembly according to claim 1, wherein the balance assembly further comprises:
a third electric motor coupled to the engine and configured to rotate a third eccentric mass relative to the engine, the third eccentric mass being coupled to a third shaft of the third electric motor; and
a fourth electric motor coupled to the engine and configured to rotate a fourth eccentric mass relative to the engine, the fourth eccentric mass being coupled to a fourth shaft of the fourth electric motor;
wherein the third and fourth electric motors are configured to rotate the third and fourth eccentric masses in a direction opposite to a direction of rotation of the first and second electric motors.

14. The balance assembly according to claim 13, wherein:
the third and fourth electric motors are provided such that the third and fourth shafts are axially aligned;
the third and fourth electric motors are offset from the first and/or second shafts; and
the third and fourth electric motors are configured to rotate at speeds equal to twice a rotational speed of a crank shaft of the engine.

15. A method of balancing vibrations of an Internal Combustion Engine (ICE) assembly, the ICE assembly comprising an ICE and a balance assembly, the balance assembly comprising:
a first electric motor coupled to the ICE and configured to rotate a first eccentric mass relative to the ICE, the first eccentric mass being coupled to a first shaft of the first electric motor; and
a second electric motor coupled to the ICE and configured to rotate a second eccentric mass relative to the ICE, the second eccentric mass being coupled to a second shaft of the second electric motor; and wherein the first and second electric motors are provided on opposite longitudinal ends of the ICE to each other, the method comprising:
driving the first and second motors to rotate the first and second eccentric masses to balance a vibration characteristic of the ICE.

16. The method according to claim 15, wherein the method further comprises:
determining a running speed of the ICE; and
wherein driving the first and second electric motors comprises driving the first and second electric motors only when the ICE is running at a speed above a threshold value.

17. The method according to claim 15, wherein the method further comprises:
identifying a variation in valve timing of the ICE; and
responsive to the identification, controlling operation of the first and/or second electric motors to adjust a difference in phase angle between the first and/or second shafts and/or a crank shaft of the ICE.

18. The method according to claims 15, wherein the method further comprises:
identifying a cylinder deactivation or reactivation of the ICE; and
responsive to the identification, controlling operation of the first and/or second electric motors to adjust a difference in phase angle between the first and/or second shafts and/or a crank shaft of the ICE.

19. The method according to claim 15, wherein the method further comprises:
identifying a cylinder deactivation or reactivation of the ICE; and
responsive to the identification, controlling operation of the first and/or second electric motors to adjust a speed of rotation of the first and/or second eccentric masses.

20. A method, comprising:
activating a first electric motor and a second electric motor responsive to engine speed exceeding a threshold speed, the first electric motor rotating a first eccentric mass positioned on a first end of an engine, the second electric motor rotating a second eccentric mass positioned on a second end of the engine; and
adjusting one or more parameters of the first electric motor responsive to a change in engine operation.

* * * * *